United States Patent
Brar et al.

(10) Patent No.: US 10,862,816 B2
(45) Date of Patent: Dec. 8, 2020

(54) CLOUD COMPUTING CLUSTER ISOLATION WITH AUTHENTICATION AND AUTOMATIC CONFIGURATION DEPLOYMENT

(71) Applicant: ORACLE INTERNATIONAL CORPORATION, Redwood Shores, CA (US)

(72) Inventors: Jagwinder S. Brar, Bellevue, WA (US); David D. Becker, Seattle, WA (US); Cyrus J. Durgin, Seattle, WA (US); Matthew G. Ryanczak, Bainbridge Island, WA (US)

(73) Assignee: Oracle International Corporation, Redwood Shores, CA (US)

( * ) Notice: Subject to any disclaimer, the term of this patent is extended or adjusted under 35 U.S.C. 154(b) by 15 days.

(21) Appl. No.: 16/153,924

(22) Filed: Oct. 8, 2018

(65) Prior Publication Data

US 2020/0112515 A1    Apr. 9, 2020

(51) Int. Cl.
*H04L 12/801*   (2013.01)
*H04L 29/06*   (2006.01)
(Continued)

(52) U.S. Cl.
CPC .......... *H04L 47/35* (2013.01); *G06F 9/45558* (2013.01); *G06F 9/5072* (2013.01); *H04L 12/4645* (2013.01); *H04L 45/64* (2013.01); *H04L 63/0823* (2013.01); *H04L 67/34* (2013.01); *G06F 2009/45587* (2013.01); *G06F 2009/45595* (2013.01)

(58) Field of Classification Search
CPC .......................... H04L 9/3247; G06F 9/45558
USPC ........................................................ 709/223
See application file for complete search history.

(56) References Cited

U.S. PATENT DOCUMENTS

2009/0109963 A1*  4/2009  Tanizawa ............... H04L 12/66
                                                      370/352
2010/0174811 A1   7/2010  Musiri et al.
(Continued)

OTHER PUBLICATIONS

Paul Congdon, Bernard Aboba, Andrew Smith, Glen Zorn & John Roese, IEEE 802.1X Remote Authentication Dial-In User Service (RADIUS) Usage Guidelines, (Internet Engineering Task Force, 2003) (available at https://tools.ietf.org/html/rfc.3580).
(Continued)

*Primary Examiner* — Mahran Y Abu Roumi
(74) *Attorney, Agent, or Firm* — Kraguljac Law Group, LLC

(57) ABSTRACT

Systems, methods, and other embodiments associated with cloud computing cluster isolation with strong authentication and automatic configuration deployment are described. In one embodiment, a method includes, in response to receiving an authentication frame through the uncontrolled port, (i) extracting data from the authentication frame for performing authentication, and (ii) parsing the authentication frame to identify a piggybacked virtual network identifier that functions as an instruction to create an isolated connection. If the authentication was successful and the piggybacked virtual network identifier was identified, creating the isolated connection between the controlled port and a virtual network that is identified by the piggybacked virtual network identifier.

20 Claims, 9 Drawing Sheets

(51) Int. Cl.
  *H04L 12/46* (2006.01)
  *H04L 29/08* (2006.01)
  *G06F 9/50* (2006.01)
  *G06F 9/455* (2018.01)
  *H04L 12/715* (2013.01)

(56) References Cited

U.S. PATENT DOCUMENTS

| | | | | |
|---|---|---|---|---|
| 2011/0225574 | A1* | 9/2011 | Khalidi | G06F 8/656 |
| | | | | 717/168 |
| 2011/0258333 | A1* | 10/2011 | Pomerantz | H04L 63/08 |
| | | | | 709/229 |
| 2014/0052994 | A1* | 2/2014 | Sabin | H04L 9/0894 |
| | | | | 713/176 |
| 2017/0005990 | A1 | 1/2017 | Birger et al. | |
| 2019/0007518 | A1* | 1/2019 | McElhoe | H04L 43/04 |
| 2019/0199626 | A1* | 6/2019 | Thubert | H04L 47/19 |

OTHER PUBLICATIONS

Carl Rigney, Steve Willens, Allan Rubens & William Simpson, Remote Authentication Dial-In User Service (RADIUS) (Internet Engineering Task Force, 2000) (available at https://tools.eitf.org/html/rfc2865).

Dan Simon, Bernard Aboba & Ryan Hurst, The EAP-TLS Authentication Protocol (Internet Engineering Task Force, 2008) (available at https://tools.ietf.org/html/rfc5216).

Arris Ent . LLC, Ruckus FastIron Security Configuration Guide, 211-216 (rev. 08.0.70, Jun. 29, 2018) (available at http://docs.ruckuswireless.com/fastiron/08.0.70/fastiron-08070-securityguide/fastiron-08070-securityguide.pdf).

Vocal Technologies, Ltd., EAPoL—Extensible Authentication Protocol over LAN, https://www.vocal.com/secure-communication/eapol-extensible-authentication-protocol-over-lan/ (accessed Oct. 5, 2018).

* cited by examiner

CLOUD COMPUTING CLUSTER ISOLATION WITH AUTHENTICATION AND AUTOMATIC CONFIGURATION DEPLOYMENT

BACKGROUND

In a cloud computing environment, many customers may share the same underlying hardware infrastructure. For both privacy and security, the customers expect that the cloud computing environment keeps the hosts and network traffic of a customer separated (isolated) from the hosts and network traffic of other customers. The customers should not be visible to each other within the cloud computing environment, nor should they be able to exchange traffic with each other, inadvertently or otherwise.

The cloud computing environment therefore should have a network control plane. The network control plane is distributed software that maintains state information about which hosts are associated with which customers, and how to keep these hosts, and their network traffic, separate. In the past, the isolation has been managed by host-side functionality of the network control plane, such as with a hypervisor and/or a smart network interface card (NIC). This host-side functionality must communicate with the network control plane and with other components of the cloud computing environment to maintain an accurate description of tenancy of the customers using the cloud computing environment.

Such a network control plane is very complex, and requires many software developers to create it. Further, such a network control plane requires that other components of the cloud computing network be updated often in order to maintain a current, accurate description of the tenancy. For example, the static configuration of switches is often dynamically updated. These updates can be error-prone and can cause operational outages. The updates also impose a network traffic burden on the cloud computing network. Further, such a network control plane is stateful, and uses cloud network resources to maintain the state information.

A simpler way of maintaining the state associated with customer isolation in a cloud computing environment is therefore desirable.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
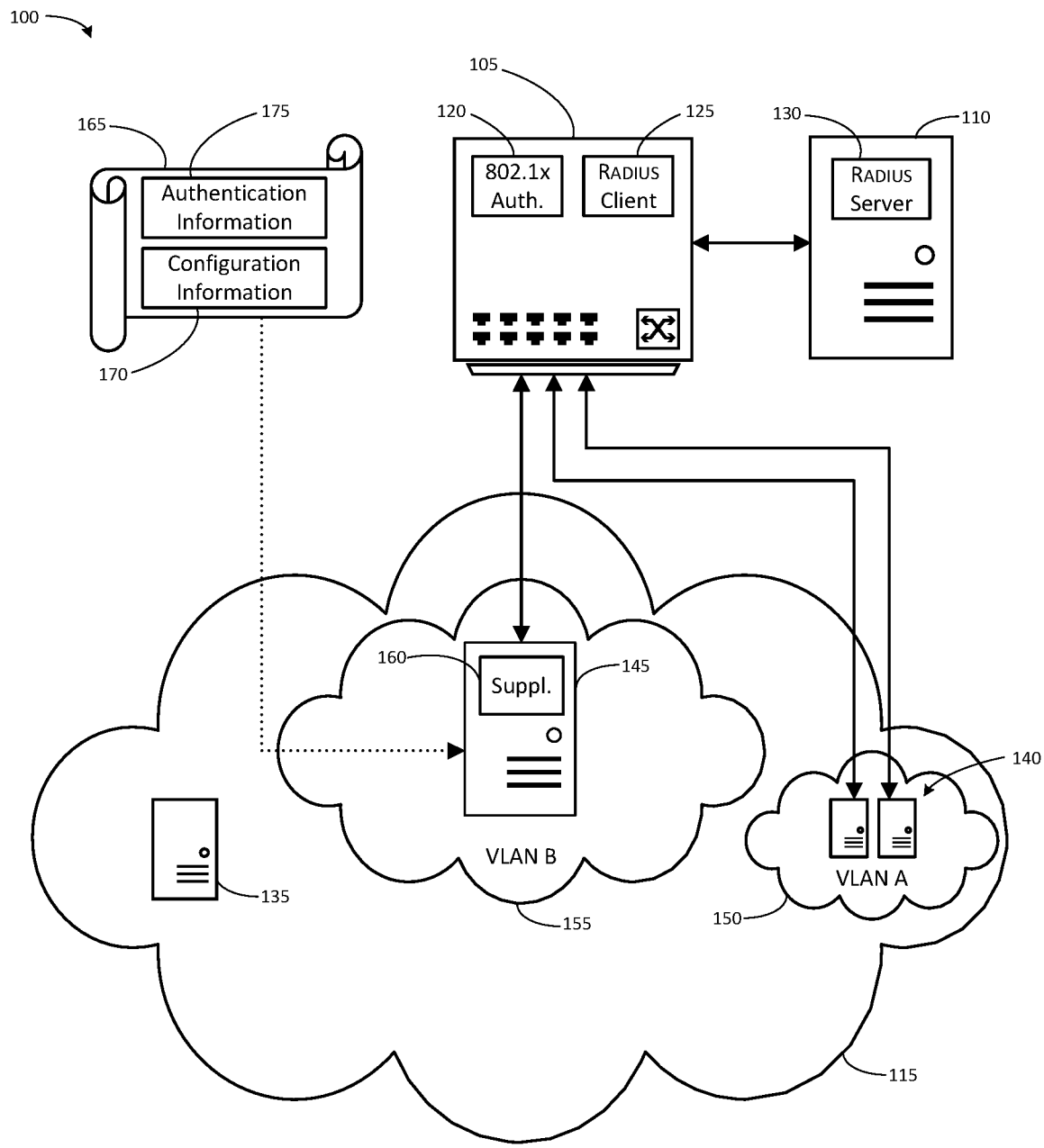
FIG. 1 illustrates one embodiment of a cloud computing system associated with authentication of, configuration deployment for, and traffic isolation between cloud computing customers.

Systems and methods are described herein that provide cloud computing cluster isolation that has strong authentication and automatic configuration deployment. In one embodiment, authentication protocols form a simple network control plane through a modified digital certificate issuance and authentication process. Cluster tenancy and network configuration information is piggybacked on digital certificates to allow the piggybacked information to pass through closed network ports that would otherwise not allow such information through the ports. The piggybacked information is, in one sense, sneaked through a port that only allows authentication traffic to pass by being embedded into the digital certificate that is passed as an authentication credential. Once through the port, the switch passes the authentication credentials to the authentication service which uses the piggybacked information to determine the customer tenancy information. The authentication service then signals the customer tenancy information back to the switch. The switch uses that information to isolate network traffic of one cluster from another using virtual networks. The digital certificate is the piggybacking medium for the network configuration information because the switch is configured to pass the digital certificate on to an authentication service that returns network configuration information to the switch if the certificate is authenticated. The authentication service is customized to extract and pass back the piggybacked network configuration information, rather than generating its own network configuration information.

In one embodiment, a customized public key infrastructure certificate service (PKI service) is used to create digital certificates that include piggybacked virtual network identifiers associated with a computing cluster. Copies of the digital certificate are provided to the physical hosts of the computing cluster. The host includes the digital certificate in an authentication frame that the host sends after the host links-up to a physical port of a switch. The authentication frame passes through an uncontrolled logical port of the physical port, which is a port restricted to only allow authentication traffic to pass through. However, since the digital certificate in the authentication frame is also carrying the piggybacked network configuration information into the switch, the piggybacked data passes through the uncontrolled logical port unperceived or undetected by the port that would otherwise not allow such data to pass.

The switch authenticates the digital certificate as belonging to the cluster using a customized authentication service. The authentication service both authenticates the certificate against a private certificate authority and additionally looks for the presence of any piggybacked data. If present, the authentication service extracts the piggybacked virtual network identifier. The switch then applies the piggybacked virtual network identifier to a controlled port of the physical port, forming a connection isolated from other network traffic passing through the switch. The controlled port of the physical port is then opened, allowing general network traffic to pass between the host and the switch in isolation from other network traffic.

Thus, the cluster tenancy information is provided to the switch in a way that allows the switch to automatically configure a virtual network that isolates the cluster hosts from other network traffic. It is therefore possible to build a customer-isolated cloud network without requiring a smart network interface card or hypervisor because the network provisioning information is dynamically signaled from the authentication service.

In one embodiment, identifying the piggybacked virtual network identifier in the authentication frame received through the uncontrolled port avoids communicating with a hypervisor or smart network interface card, thereby reducing network traffic through the port. Instead, the present configuration and technique allows isolation of the cluster without any host-side functionality, avoiding the need for a hypervisor or smart network interface to be involved in the process or even being present on the host.

Further, the elimination of these host side enforcement mechanisms reduces network latency. There is an observable improvement in network performance (for example, from 10-20 microseconds down to 2 microseconds) for a round-trip measurement because exchanges do not need to be prefaced by isolation enforcement traffic with the hypervisor or smart network interface card. This order of magnitude reduction is significant to customers.

While existing solutions require that the static configurations of the switches be updated often in order to maintain traffic isolation, the static configurations of the switches in embodiments of the present system rarely need to be updated. This increases reliability and reduces traffic overhead on the network. The present system is also simpler to manage due to the implemented features.

Yet another advantage is that the customer may be given a host without a pre-installed operating system (a bare-metal host) with direct access to the cloud computing network. In prior systems, this would be considered very insecure. However in the present system, only opening a port to a host after (i) the host is authenticated as belonging to the cluster, and (ii) the VLAN associated with the host is applied to the port provides strong data isolation. Further, no prior configuration of the hosts is required other than provision of the certificate and an EAPOL/802.1x supplicant module to pass the certificate, which reduces the possibility for error in configuration of the hosts.

Further, configuration in the network is simple. There is no per-customer or per-cluster configuration of the network until the authentication service signals a piggybacked virtual network identifier extracted from a digital certificate provided by a host.

System Embodiment

Referring now to FIG. 1, one embodiment of a system 100 for cloud computing cluster isolation that has strong authentication and automatic configuration deployment is shown. System 100 includes a network device such as a switch 105 (described in more detail with reference to FIG. 9 as switch 905), an authentication server 110, and a cloud computing environment 115.

In one embodiment, the switch 105 is configured to implement port-based authentication, such as Extensible Authentication Protocol over Local Area Network (EAPOL, IEEE 802.1x) port-based authentication. (Additional information regarding port-based authentication is included in "IEEE 802.1X Remote Authentication Dial-In User Service (RADIUS) Usage Guidelines," available at https://tools.ietf.org/html/rfc3580.) In this configuration, the physical ports of switch 105 are each divided into two logical port entities: an uncontrolled port and a controlled port.

The uncontrolled port is always open, and is used by the switch 105 to send and receive authentication protocol messages, such as EAPOL frames. The uncontrolled port is used to pass authentication messages between a supplicant host physically connected to the physical port and the authenticator module 120 within the switch 105. The authentication messages are generally used to negotiate authentication/opening of the controlled port. The uncontrolled port only accepts and passes authentication messages. No other network traffic is permitted or passed through the uncontrolled port.

Other network traffic is sent and received by the switch 105 through the controlled port. The physical port may be set to one of two states by the authenticator module 120 of switch 105: an unauthenticated state or an authenticated state.

In the unauthenticated state the controlled port is "closed," and the switch 105 prevents network traffic from entering or exiting through the controlled port. All network traffic that arrives at a closed controlled port is dropped. No network traffic will be passed through a controlled port in a closed state. The unauthenticated state is commonly the default state for physical ports.

In the authenticated state the controlled port is "open," the switch 105 allows network traffic both to enter and exit the controlled port. The open/authenticated port passes all network traffic that arrives at the controlled port.

Thus, the switch 105 will not pass any traffic to or from unauthenticated physical ports (with a closed controlled port) except to process authentication traffic. The authentication traffic, such as Extensible Authentication Protocol—Transport Layer Security (EAP-TLS) authentication, passes through the uncontrolled port. (Additional information regarding the EAP-TLS authentication protocol is included in "The EAP-TLS Authentication Protocol," available at https://tools.ietf.org/html/rfc5216.)

A client host may request access at a physical port in an unauthenticated state and provide authentication information through the uncontrolled port of the physical port. If the authentication is successful, the switch 105 changes the state of the port from unauthenticated to authenticated, opening the controlled port of the physical port to pass traffic. In some situations, the switch may pass the network traffic only into a virtual network assigned by an authentication service as part of the authentication process.

Switch 105 includes an authenticator module 120 and an authentication client module 125. Authenticator module 120 is a port authentication entity that controls access to a network by opening or closing the controlled ports of switch 105. Authenticator module 120 receives, parses, composes, and sends authentication messages, such as EAPOL network traffic. The authentication messages are received from and sent to supplicant cloud hosts through the uncontrolled ports of switch 105. The authenticator module 120 parses messages received from supplicant cloud hosts. Authenticator module 120 operates to enforce isolation of a host connected to the physical port until the host is authenticated. Authenticator module 120 may be implemented as software executed by switch 105, or as an ASIC or other circuit that performs the functions described herein for the authenticator module 120.

Authentication client module 125 is in communication with authentication service module 130 and authenticator module 120. Authentication client module 125 forwards data received from supplicant cloud hosts by the authenticator module 120 to authentication service module 130. Such data can include for example credentials such as username/password or digital certificate. Authentication client module 125 also forwards data received from authentication service module 130 to authenticator module 120. Such data can include for example access authorizations or denials which inform authenticator module 120 whether a port connected to a supplicant cloud host should be opened. Authentication client module 125 may be implemented as software executed by switch 105, or as an ASIC or other circuit that performs the functions described herein for the authentication client module 120.

Communications between Authentication client module 125 and authentication service module 130 may use the Remote Authentication Dial-In User Service (RADIUS) networking protocol. RADIUS is an authentication and authorization protocol for verifying credentials and managing network access. (Additional information regarding RADIUS is included in "Remote Authentication Dial-In User Service (RADIUS)," available at https://tools.ietf.org/html/rfc2865.)

Authentication server 110 includes authentication service module 130. Authentication service module 130 parses data received from authentication client module 125 and determines whether the credentials of the supplicant cloud host are valid and authorized. Authentication service module 130 additionally composes messages to authentication client module authorizing or declining to authorize opening the controlled port connected to the supplicant host. Authentication server 110 may, in some embodiments, be switch 105, rather than a separate server device, and authentication service module 130 is hosted by switch 105. In other embodiments, authentication server 110 may be a separate server device external to switch 105. In some embodiments, authentication service module 130 may be part of an authentication service hosted by multiple redundant external authentication server 110 devices. Authentication service module 130 may be implemented as software executed by switch 105 or authentication server 110, or as an ASIC or other circuit that performs the functions described herein for the authentication service module 130.

Authentication service module 130 may be a server application supporting RADIUS protocols, such as the open-source FreeRadius server, with certain custom modifications. In one embodiment, authentication service module 130 is configured not only to authenticate received certificates against a private certificate authority, but also to extract piggybacked configuration information, such as a piggybacked virtual network identifier. The authentication service module 130 parses a received digital certificate to detect the presence of piggybacked configuration information. In one embodiment, X.509 attributes considered to be optional are used to carry this piggybacked configuration information. The piggybacked configuration information may be contained, for example, in an otherwise unused X.509 attribute that is available to the server for processing, such as proprietary certificate extension maUPN. This piggybacked configuration information may be encrypted, and the authentication service module 130 is configured to decrypt it. The authentication service module 130 is configured to extract the piggybacked configuration information and make it available to the switch 105 by storing it, for example, as a data structure in memory 915, storage 935, or data 940. In one embodiment, the authentication service module 130 is configured to extract a piggybacked virtual network identifier and make it available to the switch 105 as one or more environment variables.

In one embodiment, cloud computing environment 115 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution Cloud computing environment 115 incorporates one or more cloud hosts such as cloud hosts 135, 140, and 145. The cloud hosts are physical computers (such as computer 805, shown in FIG. 8) with a network device (such as network devices 855, shown in FIG. 8). The network device of each cloud host is connected to a physical port of switch 105 (or of another switch connected to switch 105). The connection between the network device and the port may be a wired, wireless, fiber-optic, or other connection capable of carrying data signals between the network device and the port. In one embodiment, each cloud host may be a rack-mounted server, and the switch 105 may be a top-of-rack (ToR) ethernet switch. The servers of multiple such rack units may be interconnected by interconnecting the top-of-rack switches of each rack.

The cloud hosts are each associated with a computing cluster in the cloud computing environment 115. In some embodiments, it is desirable to isolate the network traffic of one computing cluster in the cloud computing environment 115 from the network traffic of another computing cluster. For example, it may be desirable to isolate the network traffic of one or more computing cluster(s) associated with one client entity (such as a customer) of the cloud computing environment 115 from the network traffic of other computing clusters associated with one or more different client entities, but not from the network traffic of other computing clusters associated with the one client entity.

Accordingly, the network traffic generated by the cloud hosts may be isolated in virtual networks, such as virtual networks 150 and 155. Cloud host 135 is shown un-isolated within the cloud computing environment. Cloud hosts 140 are shown isolated from the network traffic of cloud hosts 135 and 145 within virtual network VLAN A 150. Cloud host 145 is shown isolated from the network traffic of cloud hosts 135 and 140 within virtual network VLAN B 155.

Cloud hosts, such as cloud hosts 135, 140, and 145, are configured with supplicant module 160. Supplicant module 160 communicates with authentication module 120 using EAPOL authentication messages. Supplicant module 160 may be implemented as software executed by cloud hosts 135, 140, or 145, or as an ASIC or other circuit that performs the functions described herein for the supplicant module 160. In some embodiments, supplicant module 160 may be implemented as a software application, an operating system kernel module, part of the operating system kernel, firmware on a network interface card of the cloud hosts 135, 140, or 145, or even as part of the hardware of the network interface card.

A cloud host, such as cloud host 145, may be provided with the digital certificate 165 that includes piggybacked configuration information 170 in addition to authentication information 175. The piggybacked configuration information 170 may include a virtual network identifier associated with the computing cluster to which a cloud host belongs.

In one embodiment, switch 105 is configured by default to place the controlled port of the port physically connected to a cloud host in the unauthorized/closed state at cloud host boot-up or link-up. Thus, at cloud host boot-up, the cloud host is physically connected to switch 105 but is not communicatively connected with the switch 105 through any authorized/open controlled port, as shown by cloud host 135. In order to communicatively connect the cloud host to switch 105, digital certificate 165 is provided to the cloud host, as shown by cloud host 145. The piggybacked configuration information 170 indicates that cloud host 145 should have an isolated connection to VLAN B 155.

In response to a prompt from the authenticator module 120 at cloud host link-up, supplicant 160 of cloud host 145 sends an EAP-response message that contains the digital certificate through the uncontrolled port to authenticator module 120. Authentication client module 125 sends an ACCESS-REQUEST message including the digital certificate to authentication service module 130. Authentication service module 130 parses the digital certificate 165 to extract the authentication information 175 and the piggybacked configuration information 170. Authentication service module 130 authenticates the digital certificate based on the authentication information 175.

If the authentication process is successful and the piggybacked configuration information 170 was present, authentication service module 130 sends an ACCESS-ACCEPT message to authentication client module 125 that includes at least some of the piggybacked configuration information 170 such as the virtual network identifier indicating VLAN B. Switch 105 then applies the virtual network identifier "VLAN B" to the controlled port of the port physically connected to cloud host 145, thus creating an isolated connection. Then, switch 105 opens the controlled port of the port physically connected to cloud host 145.

If the authentication process is unsuccessful and or the piggybacked configuration information 170 is not present authentication service module 130 sends an ACCESS-REJECT message to authentication client module 125. Switch 105 would then apply a quarantine virtual network identifier to the controlled port of the port physically connected to cloud host 145 thus creating an isolated connection. Then switch 105 opens the controlled port of the port physically connected to cloud host 145, limiting the access of cloud host 145 to the quarantined VLAN only.

Method Embodiment

Figure 2:
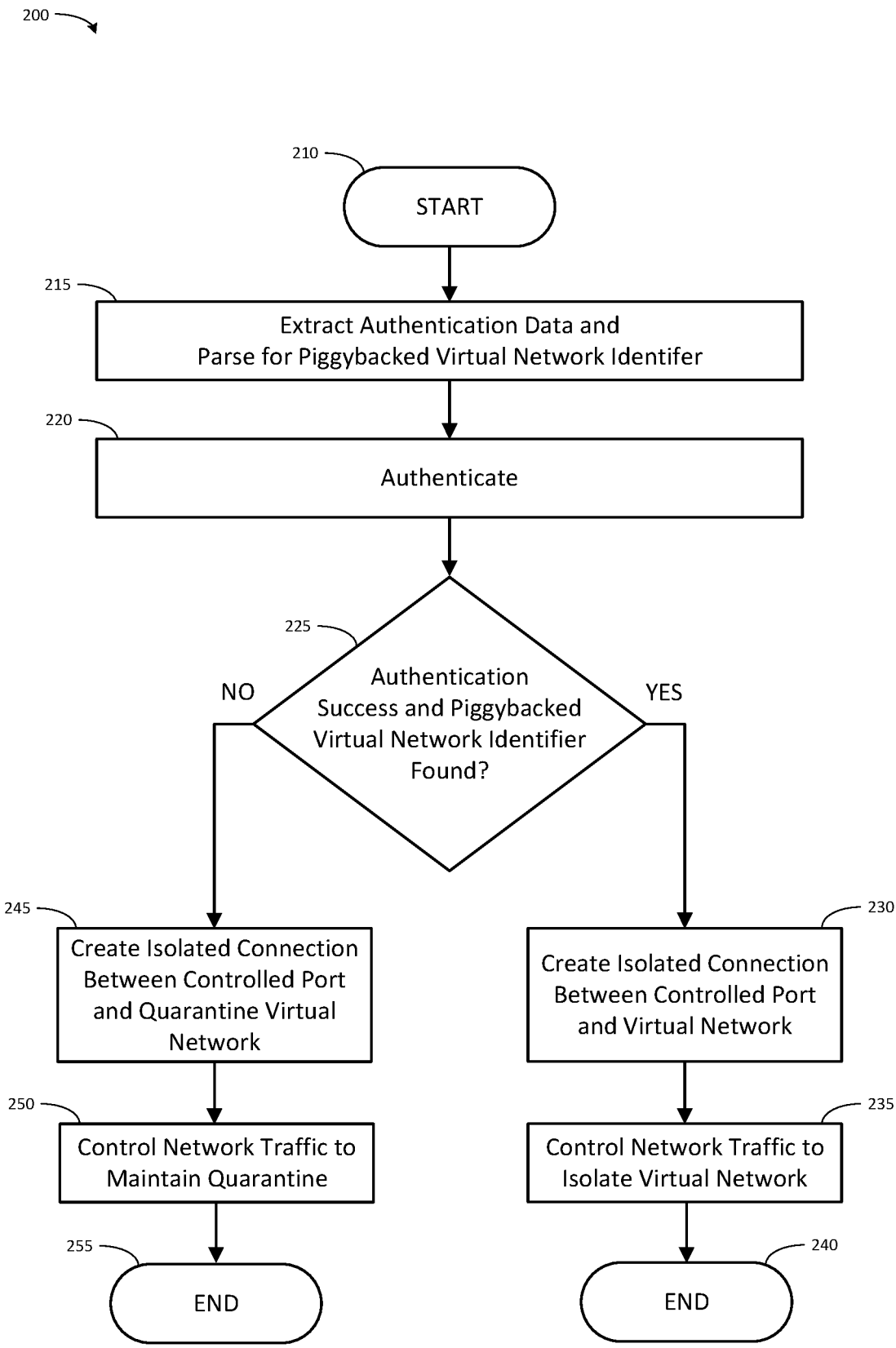
FIG. 2 illustrates one embodiment of a computer-implemented method associated with authentication of, configuration deployment for, and traffic isolation between cloud computing customers.

FIG. 2 shows an embodiment of a computer-implemented method 200 associated with cloud computing cluster isolation that has authentication and automatic configuration deployment. In one embodiment, a network device (such as switch 905, shown in FIG. 9) is implemented with an executable algorithm that is configured to perform the method 200. The network device 905 has at least one of its physical ports (such as network ports 980, shown in FIG. 9) logically divided into (i) a controlled port and (ii) an uncontrolled port. Method 200 may initiate following various triggers, such as (i) receiving an authentication frame through an uncontrolled port of the network device, (ii) receiving a signal indicating that a user has initiated method 200, or (iii) launching method 200 based on a scheduled time(s) or time interval(s).

The method 200 initiates at start block 210 and processing continues to process block 215. At process block 215, in response to receiving an authentication frame through the uncontrolled port, data is extracted from the authentication frame for performing authentication, and the authentication frame is parsed to identify a piggybacked virtual network identifier that functions as an instruction to create an isolated connection. In one embodiment, the extracting and parsing include one or more of the following steps.

Initially, processor 910 parses the authentication frame to identify a digital certificate. On identification, processor 910 extracts the digital certificate and stores it, for example as a data structure in memory 915, storage 935, or data 940.

In one embodiment, where the authentication service is implemented by switch 905, processor 910 then parses the digital certificate to identify the authentication data. Processor 910 then extracts the authentication data and stores it, for example as a data structure in memory 915, storage 935, or data 940.

Processor 910 additionally parses the digital certificate to identify piggybacked configuration information that contains a piggybacked virtual network identifier. Processor 910 then extracts the piggybacked configuration information and stores it, for example as a data structure in memory 915, storage 935, or data 940. In some embodiments, the piggybacked configuration information is an encrypted blob. If the piggybacked configuration information is encrypted, Processor 910 decrypts the piggybacked configuration information, and then parses the (decrypted) piggybacked configuration information to identify the piggybacked virtual network identifier. In one embodiment, the piggybacked virtual network identifier may include both a VLAN ID, and a VXLAN VNI. Processor 910 extracts the piggybacked virtual network identifier and storing it, for example as a data structure in memory 915, storage 935, or data 940.

Figure 8:
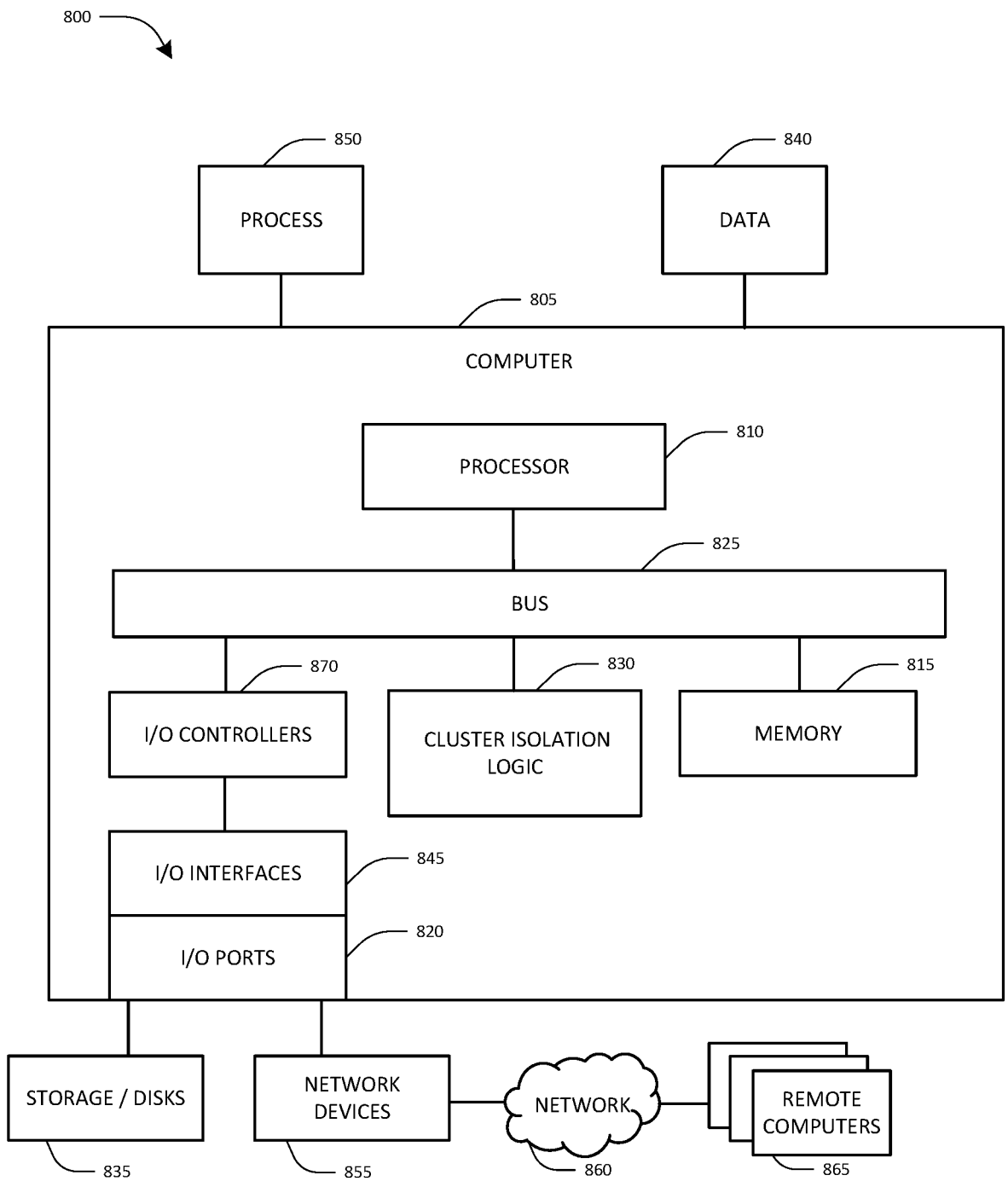
FIG. 8 illustrates an embodiment of a computing system configured with the example systems and/or methods disclosed.
Figure 9:
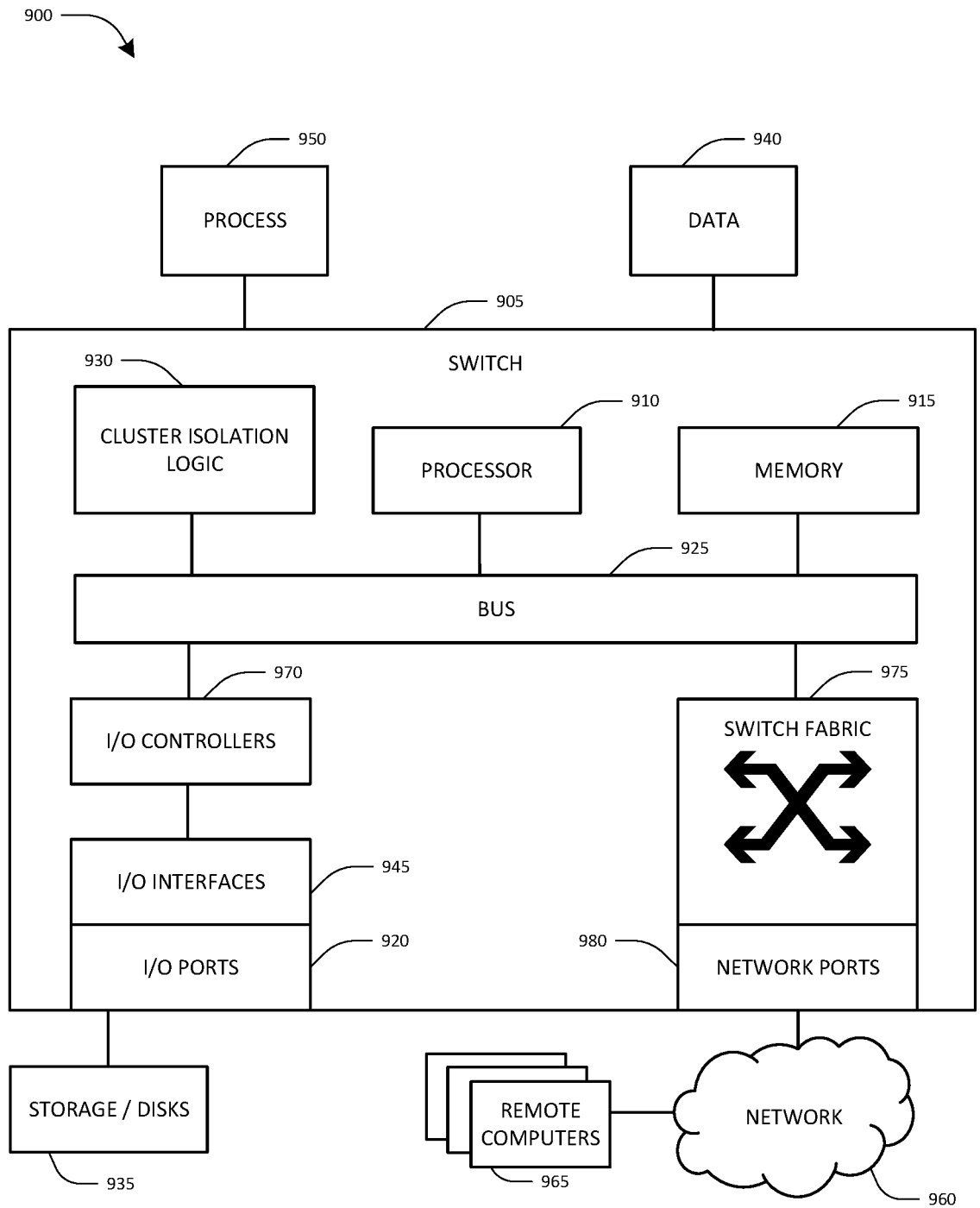
FIG. 9 illustrates an embodiment of a network switch configured with the example systems and/or methods disclosed.

In another embodiment, where the authentication service is implemented by one or more external authentication server devices (such as computer 805, shown in FIG. 8), processor 905 sends the digital certificate to an external authentication server device through a network (such as network 860, shown in FIG. 8, or network 960, shown in FIG. 9, and which may be the same network). Processor 810 (shown in FIG. 8) of the external authentication server, rather than processor 910 of the switch 905, performs the steps described above to extract the piggybacked virtual network identifier. Processor 810 stores the piggybacked virtual network identifier, for example as a data structure in memory 815, storage 835, or data 840.

In some embodiments, the piggybacked virtual network identifier functions as an instruction to create an isolated connection between the controlled port and a virtual network indicated by the piggybacked virtual network identifier.

Upon completion of the extraction and storage of (i) the authentication information and (ii) the piggybacked virtual network identifier, processor 910 (if performed locally on the switch 905) or processor 810 (if performed on the external authentication server device) sends a message or stores data indicating that the extraction and storage is complete. Process block 215 completes and processing continues at process block 220.

At process block 220, the digital certificate is authenticated based on the stored authentication data. In one embodiment, the authenticating includes one or more of the following steps.

In an embodiment where the authentication service is implemented by switch 905, processor 910 parses the message or data indicating that the extraction and storage is complete to determine whether or not to begin process block 215. Processor 910 retrieves the stored authentication data and authenticates the digital certificate based on this data. In one embodiment, the certificate is authenticated by passing the authentication data to a private certificate authority. In another embodiment, the authentication process is customized such that the certificate is valid so long as it has not expired and is signed by the private certificate authority (a trusted certificate authority).

Processor 910 receives a message or data from the certificate authority indicating either that the digital certificate is authentic, or that the digital certificate is not authentic, and storing it, for example as a data structure in memory 915, storage 935, or data 940. The authentication verifies that the host belongs to a cluster associated with the piggybacked virtual network identifier.

In an embodiment where the authentication service is implemented by the external authentication server device, processor 810 of the external authentication server, rather than processor 910 of the switch 905, performs the steps described above to authenticate the digital certificate. Once processor 810 has received a message or data that the certificate is authentic or is not authentic, processor 810 sends this result to switch 905, and processor 910 of switch 905 stores it, for example as a data structure in memory 915, storage 935, or data 940.

Upon completion of the authenticating, processor 910 sends a message or stores data indicating that the result of the authentication has been stored. Process block 220 completes and processing continues at decision block 225.

In some embodiments, the certificate authority should be private because the signed certificates will be valid for authentication. This certificate authority should be inaccessible outside system 100.

At decision block 225, processor 910 determines whether the authentication was successful, and whether the piggybacked virtual network identifier was found. In one embodiment, the determining includes one or more of the following steps. Processor 910 parses the message or data indicating that the result of the authentication has been stored to determine whether or not to begin decision block 225. Processor 910 retrieves the stored piggybacked virtual network identifier and the stored message from the certificate authority indicating the authenticity of the certificate. Processor 910 determines from the stored piggybacked virtual network identifier and from the stored message whether the authentication was successful and the piggybacked virtual network identifier was identified.

If the authentication was successful and the piggybacked virtual network identifier was identified, processor 910 sends a message or stores data indicating a success condition. In one embodiment, processor 910 has authentication server return the piggybacked virtual network identifier to the authentication client as switch configuration information. Process block 225 completes and processing continues at decision block 230. If the authentication was not successful or the piggybacked virtual network identifier was not identified, processor 910 sends a message or stores data indicating a failure condition. Process block 225 completes and processing continues at decision block 245.

At process block 230, processor 910 creates the isolated connection between the controlled port and a virtual network that is identified by the piggybacked virtual network identifier. In one embodiment, the creating includes one or more of the following steps. Processor 910 parses the message or data indicating a success condition to determine that process block 230 should begin. Processor 910 retrieves the stored piggybacked virtual network identifier.

If no virtual network identified by the piggybacked virtual network identifier is presently configured on the network device 905, processor 910 creates a new virtual network and gives the new virtual network the piggybacked virtual network identifier as its network identifier. Alternatively, a virtual network with the same identifier as the piggybacked virtual network identifier is configured on network device 905 prior to retrieving the piggybacked virtual network identifier.

Processor 910 then creates the isolated connection between the controlled port and a virtual network that is identified by the piggybacked virtual network identifier. In some embodiments, creating the isolated connection includes processor 910 connects the controlled port to the virtual network as the isolated connection. The networking device is configured to direct all traffic received though the controlled port into the virtual network. This is in order to isolate the controlled port before opening the controlled port to pass network traffic other than authentication traffic.

At the time the host links-up to the controlled port, the controlled port is in a closed (physical port unauthorized) state preventing the passage of network traffic other than authentication traffic. After the isolated connection between the controlled port and the virtual network, processor 910 opens the controlled port to permit the passage of network traffic between a host and the virtual network through the isolated connection. To open the controlled port, the physical port is set to an authorized state. Upon opening the controlled port with an isolated connection to the virtual network, process block 230 completes and processing continues at process block 235.

At process block 235, network device 105 controls network traffic entering and leaving the network device to isolate the network traffic of the virtual network from other network traffic through the network device. In one embodiment, this controlling includes one or more of the following steps. Network device 105 operates to allow only network traffic entering the network device at the controlled port or one or more additional controlled ports assigned to the virtual network to enter the virtual network. Network device 105 prevents any network traffic not arriving through ports assigned to the virtual network from passing through the ports assigned to the virtual network. Process block 235 subsequently completes and processing continues to end block 240, where processing completes.

Note that method 200 does not require modification of any static configuration of the network device in order to create an isolated customer network. Thus, creating the isolated connection between the controlled port and a virtual network effects a dynamic network configuration of a customer overlay network without modifying a static configuration of the network device. The need for a configuration management system to enforce the isolation of customer overlay networks through modification of the static configurations of switches is obviated.

Further, the port-based nature of the authentication process ensures that no wiring or configuration errors can cause an incorrect port to be authenticated.

Example Authentication Progression with Piggybacked Configuration

Figure 3:
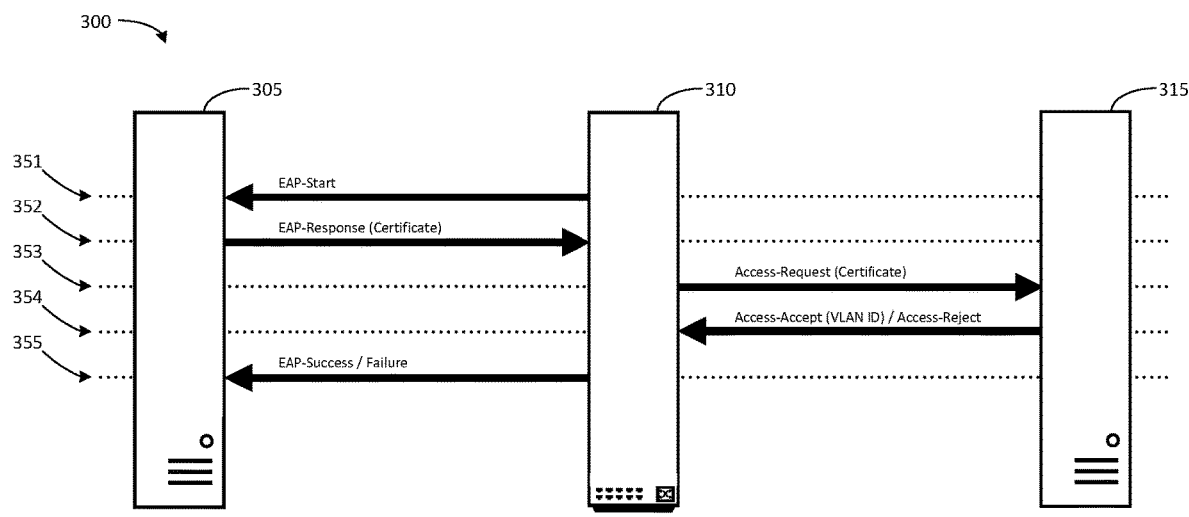
FIG. 3 illustrates one embodiment of an authentication progression between elements of the system to authenticate, configure deployment, and isolate traffic for a new cloud computing customer host.

FIG. 3 illustrates one embodiment of an authentication progression 300 between elements of the system 100 to authenticate, configure deployment, and isolate traffic for a new cloud computing customer host. Authentication messaging between a new host 305, a switch 310 (such as switch 105), and an authentication service 315 (such as authentication service module 130 of authentication server 110), operates to connect new host 305 to 80 a cloud computing environment, such as cloud computing environment 115.

The supplicant of host 305 and the authenticator of switch 310 exchange authentication messages between the host 305 and the switch 310. In some embodiments the authentication messages exchanged between host 305 and switch 310 are 802.1x/EAP frames. As discussed above, the authentication messages passed between the host 305 and the switch 310 pass through the uncontrolled port of the physical port by which the host 305 is connected to the switch 310. Thus, authentication frames may be received by the switch 310 through the uncontrolled port when the controlled port is closed.

Embodiments of the system and method make advantageous use of this port configuration, enabling a piggybacked virtual network identifier to pass through the uncontrolled port because the piggybacked data is added to a digital certificate included as a credential in the authentication frame. Adding the piggybacked data to the digital certificate makes the piggybacked data hidden from the port/switch. This allows the piggybacked data to pass through undetected as part of the digital certificate and/or the authentication frame. This virtual network identifier is thus "piggybacked" through the uncontrolled port, allowing host 305 to provide network configuration information to the switch 310 even though the controlled port is closed.

The authentication client of switch 310 and the authentication service 315 exchange authentication messages. In some embodiments the authentication messages exchanged between switch 310 and authentication service 315 are RADIUS access packets.

Advantageous use is also made of the authentication process. The switch 310 is not ordinarily configured to extract the piggybacked data received through the uncontrolled port. But, the switch 310 will further the pass digital certificate to authentication service 315. An authentication request may be made by sending an access-request packet that includes credentials to the authentication service 315. The digital certificate is one such credential. Adding the piggybacked data to the digital certificate allows the piggybacked data to be passed to the authentication service 315 using the ordinary handling processes of switch 310. The virtual network identifier is thus "piggybacked" to the authentication service 315, allowing the authentication service 315 to receive network configuration information from the host 305, even though the controlled port is closed.

The order of messages between host 305, switch 310, and authentication service 315 is indicated by references 351-355.

At reference 351, the authenticator of switch 310 sends a message requesting the identity of new host 305, such as an EAP-Request Identity frame. This message may have been sent in response to the switch 310 detecting the new host 305 at the physical port. The message is received by the supplicant of new host 305.

In response to receiving the message at reference 351, at reference 352, the supplicant of host 305 sends a message providing the identity of new host 305, along with a certificate including a piggybacked virtual network identifier, to the switch 310. This may be an EAP-Response Identity frame containing a host identifier for the new host 305 such as a user identifier. The message is received by the authenticator of switch 310.

In response to switch 310 receiving the message at reference 352, the switch 310 attempts to authenticate the new host 305 against authentication service 315. At reference 353, the authenticator parses the message to extract the host identifier and the certificate from the message. The authentication client (such as authentication client 125) of the switch 310 then encapsulates at least the host identifier and the certificate in an access request message and sends it to the authentication service 315. In some embodiments, the access request message should include the host identifier, the certificate, the port number of the physical port of the switch 310 to which the new host is connected (the source port for the message), the media type of the port, and the MAC address of the new host. The port number, media type, and host MAC address are information available to the switch 310. The access request message may be a RADIUS Access-Request package, and the host identifier may be passed using RADIUS attribute 5, Username; the certificate may be passed using RADIUS attribute 2, User-Password; the port number may be passed using RADIUS attribute 5, NAS-Port; the media type may be passed using RADIUS attribute 61, NAS-Port-Type; and host MAC address may be passed using RADIUS attribute 31, Calling-Station-ID.

In response to receiving the message at reference 353, authentication service 315 attempts to authenticate the certificate and retrieve the piggybacked virtual network identifier. An ordinary authentication service would authenticate the certificate and, if the authentication was successful, respond with a message to the switch 310 indicating that access should be granted, such as a RADIUS Access-Accept message. However, authentication service 315 authenticates the certificate, and additionally parses it to extract the piggybacked virtual network identifier. If the authentication was successful, and the piggybacked virtual network identifier was found, authentication service 315 responds with a message to the switch 310 indicating that access should be granted (such as a RADIUS Access-Accept message).

If the authentication service 315 successfully authenticates the certificate, and the piggybacked virtual network identifier was found, at reference 354 authentication service 315 sends a message back to the switch 310 indicating that access should be granted. In some embodiments, this message should include an instruction to use a VLAN, and the piggybacked virtual network identifier. The message may be a RADIUS Access-Accept package, and the instruction to use a VLAN may be passed using RADIUS attribute 64, Tunnel-Type with Value 13 (which indicates a VLAN); and the piggybacked virtual network identifier may be passed using RADIUS attribute 81, Tunnel-Private-Group-ID.

If the authentication service 315 does not successfully authenticate the certificate, or the piggybacked virtual network identifier is not found, at reference 354 authentication service 315 sends a message back to the switch 310 indicating that access should not be granted. In some embodiments, this message may be a RADIUS Access-Reject package.

In response to receiving the message at reference 354 indicating that access should be granted, switch 310 applies the piggybacked virtual network identifier to the controlled port, causing all network traffic arriving at the controlled port to be directed into a virtual network indicated by the piggybacked virtual network identifier, and permitting network traffic to pass to the controlled port from within the virtual network. Switch 310 then sets the controlled port to an open state (physical port authorized state), allowing network traffic to pass between the new host 305 and the virtual network. At reference 355, switch 310 sends a message indicating that access was granted to new host 305. This message may take the form of an EAP-Success frame.

In response to receiving the message at reference 354 indicating that access should not be granted, switch 310 maintains the controlled port in a closed state (physical port unauthorized state) and awaits further authentication traffic requests.

In the event that the authenticator authenticates a port, but a virtual network identifier does not accompany the message that access should be granted, switch 310 applies a quarantine virtual network identifier to the controlled port, causing all network traffic arriving at the controlled port to be directed into a quarantine virtual network indicated by the quarantine virtual network identifier. This prohibits communication with any other port. In one embodiment, switch 310 then sets the controlled port to an open state (physical port authorized state), allowing network traffic to pass between the new host 305 and the quarantine virtual network. In an alternative embodiment, the controlled port is set to an unauthorized (closed) state. At reference 355, switch 310 sends a message indicating that access was not granted to new host 305. This message may take the form of an EAP-Failure frame.

Note that in some embodiments, additional message traffic may be interspersed with the foregoing traffic in order to effect the described outcome or to support additional features. For example, traffic for security protocol negotiation, such as when using the Extensible Authentication Protocol—Transport Layer Security (EAP-TLS) protocol. Further, information described above as being passed by a single message may be passed by multiple messages, or the other way around.

Isolating Cluster Traffic on a Single Switch

To isolate each computing cluster from all other computing clusters in the cloud computing environment, a unique virtual network is applied to the cluster. Each cluster is associated in a one-to-one relationship with a unique virtual network. In one embodiment where the number of hosts in a computing cluster does not exceed the number of available switch ports, a unique virtual local area network (VLAN) per cluster per switch is provided. This may be the case for example in a single-rack computing cluster configuration.

Here, processor 910 causes network device 105 to (i) create a second isolated connection between the second controlled port and a second virtual network; and (ii) control network traffic to isolate the second virtual network from the network traffic received through the controlled port. Processor 910 may cause network device 105 to permit network traffic to enter the virtual network only through either (i) the isolated connection or (ii) one or more additional isolated connections to one or more additional controlled ports. Processor 910 may also cause network device 105 to prevent network traffic that enters the virtual network from exiting the virtual network except through either (i) the isolated connection or (ii) the one or more additional isolated connections.

Figure 4:
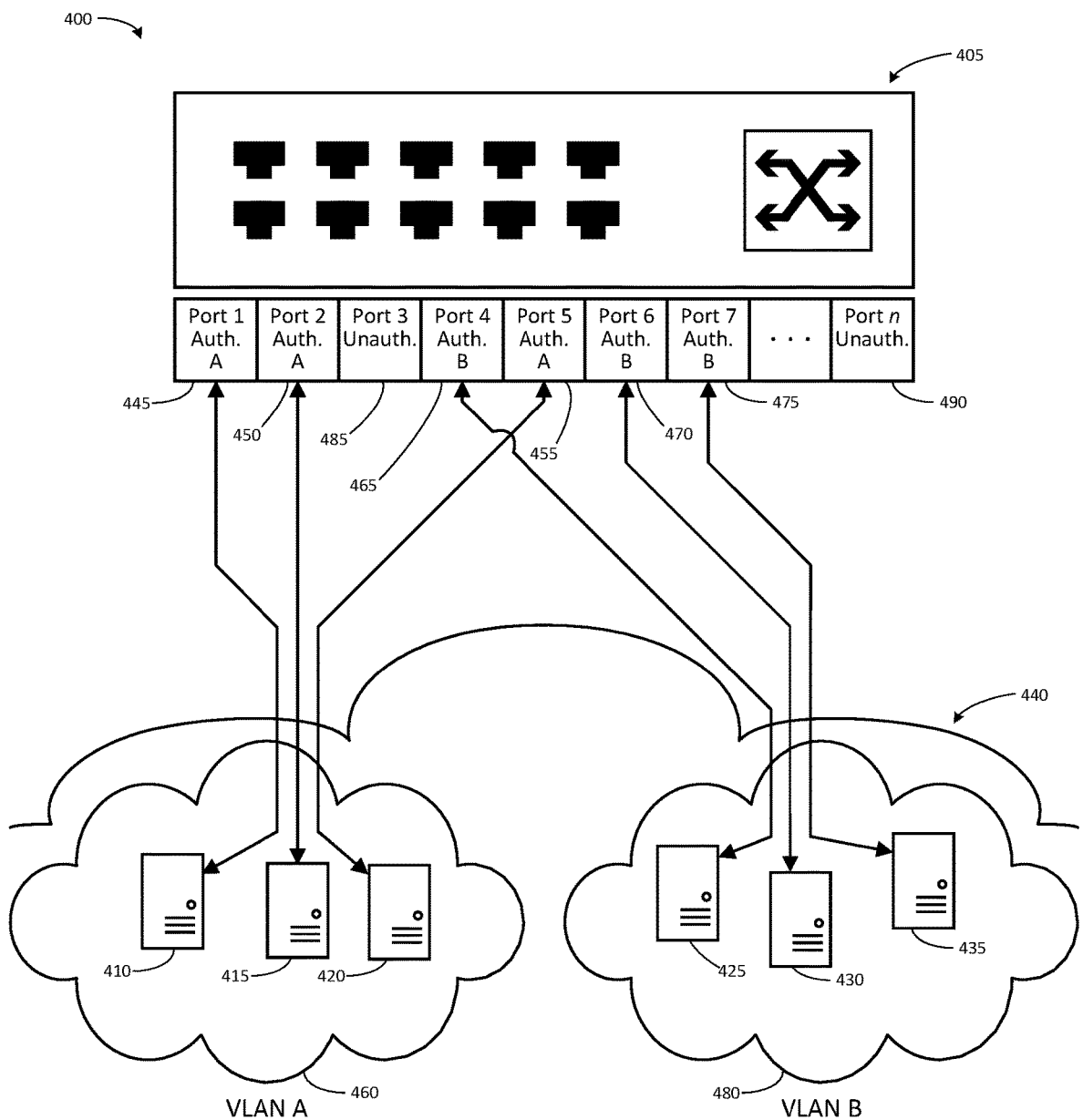
FIG. 4 illustrates an embodiment of a system associated with authentication of, configuration deployment for, and traffic isolation between cloud computing customers in a single-switch environment.

Referring now to FIG. 4, one embodiment 400 shows a switch 405 which has hosts 410-435 provisioned to two separate cloud computing clusters in a cloud computing environment 440. The hosts 410, 415, and 420 are connected to to Port 1 445, Port 2 450, and Port 5 455, respectively. The hosts 410, 415, and 420 are authenticated as belonging to a first cluster and the network traffic through Port 1 445, Port 2 450, and Port 5 455, is assigned to virtual network A 460. The hosts 425, 430, and 435 are connected to Port 4 465, Port 6 470, and Port 7 475. The hosts 425, 430, and 435 are authenticated as belonging to a second cluster and the network traffic through Port 4 465, Port 6 470, and Port 7 475, is assigned to virtual network B 480. Port 3 485 and all other ports 490 of switch 405 are set to an unauthenticated state.

Switch 405 enforces the separation of virtual network A 460 and virtual network B 480. Network traffic from any of hosts 410, 415, and 420 may only pass through each of Port 1 445, Port 2 450, and Port 5 455. Network traffic from any of hosts 410, 415, and 420, may not pass through any of Port 4 465, Port 6 470, Port 7 475, or any unauthorized port, 485, 490.

A new host may join either of virtual network A 460 or virtual network B 480, or may be assigned to a further virtual network by presenting a digital certificate with piggybacked configuration information at an unauthorized port, 485, 490. Further, any of the existing hosts 410, 415, 420, 425, 430, and 435 may be disconnected from their current virtual network and assigned to another virtual network by presenting a digital certificate with other piggybacked configuration information that indicates a different virtual network than the one to which the host is presently connected.

In this way, the traffic of two network clusters can pass in isolation through the switch.

Isolating Cluster Traffic Across Multiple Switches

In another embodiment, (i) the number of hosts in a computing cluster exceeds the number of available switch ports thus requiring multiple switches, or (ii) multiple switches may otherwise be desirable or required to support the hosts of a computing cluster. In this case, separate VLANs per switch are used in conjunction with a further virtual network encapsulation, such as virtual extensible LAN (VXLAN), to carry traffic between switches and maintain isolation. This may be the case for example in a multiple-rack computing cluster configuration.

Here, at least one of the one or more additional controlled ports is a logical division of a second physical port included in a second networking device and the virtual network includes an overlay network for interconnecting two or more subnetworks. The processor 910 causes the network device 105 to parse the piggybacked virtual network identifier to identify (i) an overlay network identifier that indicates the overlay network, and (ii) a first subnetwork identifier that indicates a first virtual subnetwork associated with the networking device. The overlay network identifier functions as an instruction to create an isolated interconnection. In response to identifying the overlay network identifier, processor 910 creates the isolated interconnection between the first virtual subnetwork and at least a second virtual subnetwork associated with the second networking device. There is also a second isolated connection between the second virtual subnetwork and the at least one of the one or more additional controlled ports.

Figure 5:
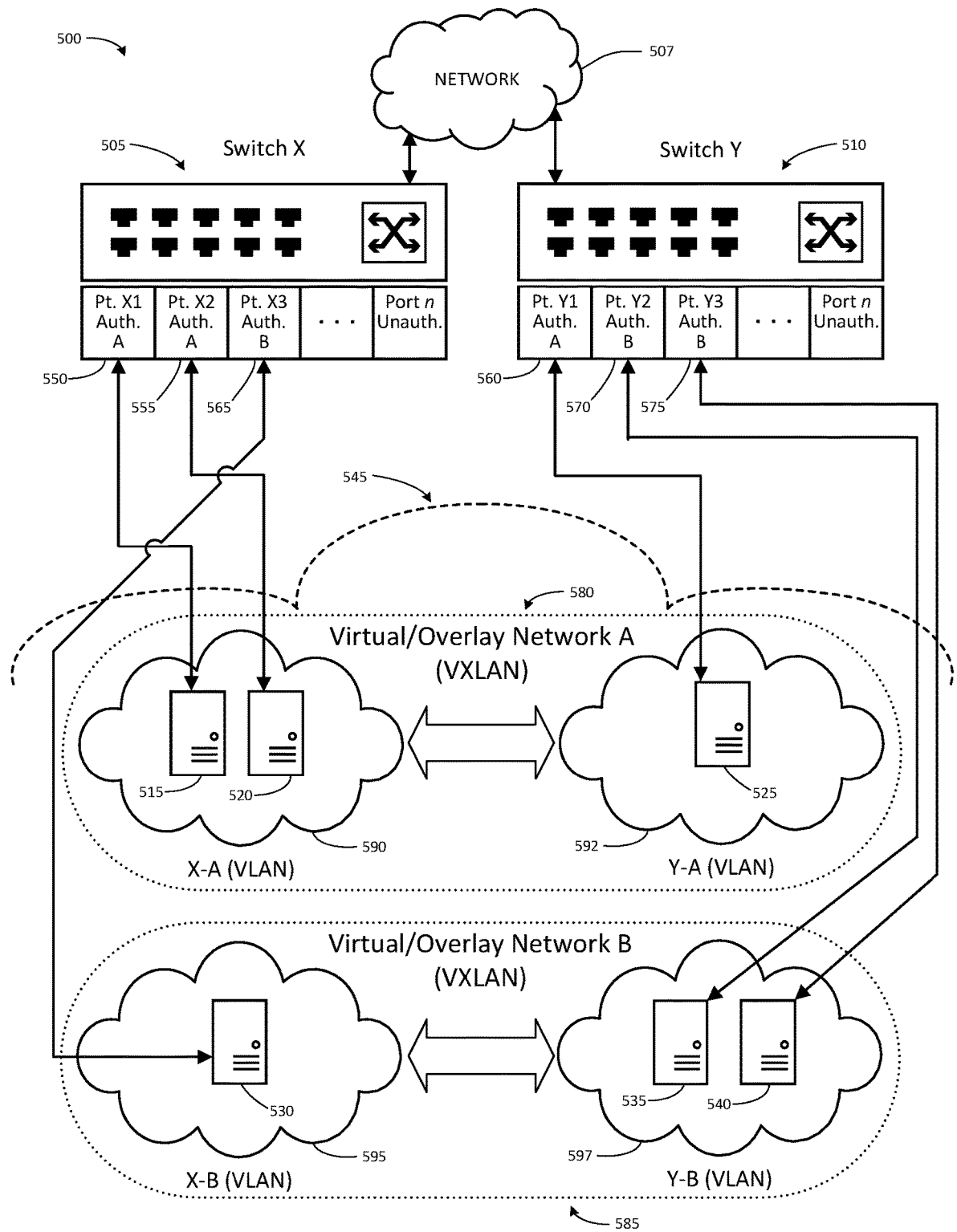
FIG. 5 illustrates an embodiment of a system associated with authentication of, configuration deployment for, and traffic isolation between cloud computing customers in a multi-switch environment.

Referring now to FIG. 5, one embodiment 500 shows a switch X 505 connected by a network 507 to a switch Y 510. Switches X 505 and Y 510 have hosts 515-540 provisioned to two separate cloud computing clusters in a cloud computing environment 545. The hosts 515 and 520 are connected to Port X1 550 and Port X2 555, respectively, of switch X 505. Host 525 is connected to Port Y1 560 of switch Y 510. Host 530 is connected to Port X3 565 of switch X 505. The hosts 535 and 540 are connected to Port Y2 570 and Port Y3 575, respectively, of switch Y 510. The hosts 515, 520, and 525 are authenticated as belonging to a first cluster and the network traffic through Port X1 550, Port X2 555, and Port Y1 560, is assigned to virtual/overlay network A 580, which includes virtual network X-A 590 and virtual network Y-A 592. The hosts 530, 535, and 540 are authenticated as belonging to a second cluster and the network traffic through Port X3 565, Port Y2 570, and Port Y3 575, is assigned to virtual/overlay network B 585, which includes virtual network X-B 595 and virtual network Y-B 597. The virtual/overlay networks may be implemented as VXLANs. The virtual networks may be implemented as VLANs. All other ports of switch X 505 and switch Y 510 are set to an unauthenticated state.

The switches, switch X 505 and switch Y 510 enforce the separation of traffic between hosts assigned to separate virtual/overlay networks in a similar manner as described above with reference to FIG. 4 by isolating the traffic within virtual networks associated with the virtual/overlay networks. Switch X 505 thus prevents the exchange of network traffic between hosts 515 and 520, which are assigned to virtual network X-A 590, and host 530, which is assigned to virtual network X-B 595. Also, switch Y 510 prevents the exchange of network traffic between host 525, which is assigned to virtual network Y-A 592, and hosts 535 and 540, which are assigned to virtual network Y-B 597.

In addition, the switches also pass network traffic between a virtual network and other switches, provided that the network traffic is associated with the same virtual/overlay network as is the virtual network. Thus, switch X 505 and switch Y 510 permit the exchange of network traffic between hosts 515 and 520, and host 525, each of which is assigned to the same virtual/overlay network A 580. Similarly, switch X 505 and switch Y 510 permit the exchange of network traffic between host 530 and hosts 535 and 540, each of which is assigned to the same virtual/overlay network B 585. But, switch X 505 and switch Y 510 prevent the exchange of network traffic between hosts 515 and 520, which are assigned to virtual/overlay network A 580 and hosts 535 and 540, which are assigned to virtual/overlay network B 585. Similarly, switch X 505 and switch Y 510 prevent the exchange of network traffic between host 525, which is assigned to virtual/overlay network A 580 and host 530, which is assigned to virtual/overlay network B 585.

Network traffic from hosts 515 and 520 belongs to VLAN X-A, as such it may only pass through each of port X1 550, port X2 555, and to switch Y 510 through a VXLAN associated with virtual/overlay network A 580. Switch Y 510 will only pass traffic arriving through the VXLAN associated with virtual network A 580 into the VLAN associated with Y-A—or to host 525 on port Y1 560. Network traffic from host 530 belongs to VLAN X-B, as such it may not pass through either of Port X1 550 or Port X2 555, or any unauthorized port. Network traffic from hosts 535 and 540 belongs to VLAN Y-B, as such it may only pass through each of port Y2 570, port Y3 575, and to Switch X 505 through a VXLAN associated with virtual/overlay network B 585. Switch X 505 will only pass traffic arriving through the VXLAN associated with virtual network B 585 into the VLAN associated with X-B—or to host 530 on port X3 565. Network traffic from host 525 belongs to VLAN Y-A, as such it may not pass through either of Port Y2 570 or Port Y3 575, or any unauthorized port.

The virtual networks X-A 590 and Y-A 592 are linked by the VXLAN associated with virtual/overlay network A 580. The virtual networks X-B 595 and Y-B 597 are linked by the VXLAN associated with virtual/overlay network B 585.

A new host may join either of virtual network A 480 or virtual network B 485, or may be assigned to a further virtual network by presenting a digital certificate with piggybacked configuration information at an unauthorized port of either switch X 505 or Switch Y 510

In this way, the traffic of two network clusters can pass in isolation across multiple switches.

Cluster Setup

Figure 6:
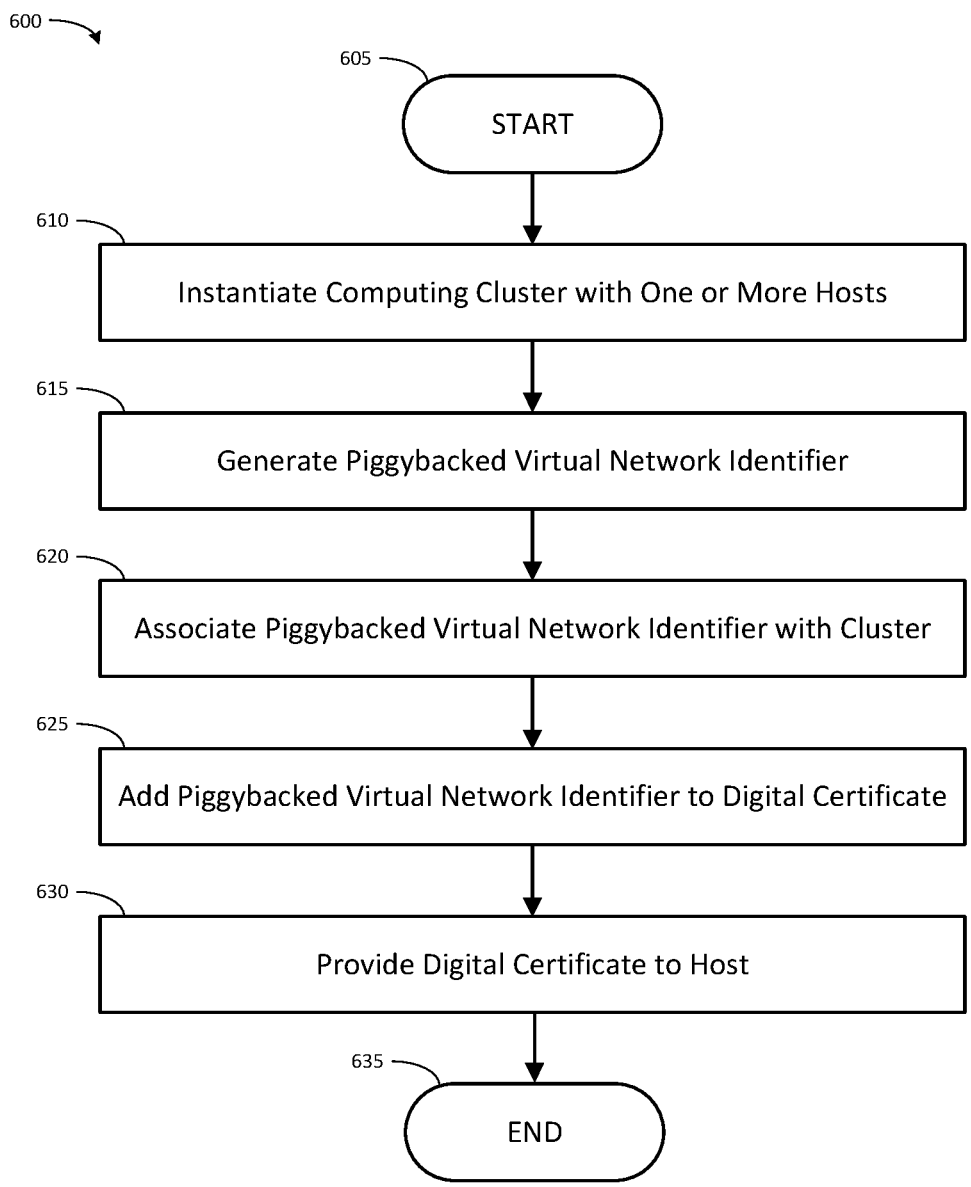
FIG. 6 illustrates a computer-implemented method associated with instantiating a computing cluster with hosts that may be authenticated, configured, and isolated in accordance with an embodiment of the method disclosed.

Referring now to FIG. 6, one embodiment of a computer-implemented method 600 associated with initialization of a cluster instantiation method in accordance with one embodiment is shown. This method 600 may initiate following various triggers, such as (i) a request from a user of the system for access to cloud computing resources, (ii) a request for a new computing cluster, (iii) receiving a signal indicating that a user has initiated method 600, or (iv) launching method 600 based on a scheduled time(s) or time interval(s).

The method 600 initiates at start block 605 and processing continues to process block 610. At process block 610, processor 810 instantiates a computing cluster in a cloud computing environment. In this instantiation, at least one host in the computing cluster is connected to the at least one physical port. In one embodiment, this instantiating includes one or more of the following steps.

One or more hardware computers operates an compute control plane service(s). In response to determining that a customer has requested a new computing cluster, the compute control plane service creates an instance pool for the new cluster. The compute control plane service chooses a location for the new computing cluster on one or more hardware hosts interconnected by a switch based on the availability of computing resources sufficient to support the new computing cluster. Each of the hardware hosts is connected to a physical port of a network device in order to effect the interconnection.

The compute control plane service places the new computing cluster in the chosen set of one or more hardware hosts. Then, the compute control plane service assigns a host group identifier associated with the instance pool to be a cluster identifier for purposes of hardware network management. The compute control plane service records the host group identifier and a network device identifier associated with the network device (for example, the switch ID), for example, in memory 815, storage 835, or data 840. Processing at process block 610 completes, and processing continues to process block 615.

At process block 615, processor 810 generates the piggybacked virtual network identifier. In one embodiment, this generating includes one or more of the following steps.

The compute control plane service creates a layer 2 virtual network identifier selected for the cluster (such as a VLAN ID, or a switch ID/VLAN ID tuple per switch, if the cluster hosts are connected across multiple switches). The compute control plane service may also create a layer 3 virtual network identifier (such as a VXLAN VNI) for the cluster. The compute control plane service stores the layer 2 and layer 3 virtual network identifiers for example, in memory 815, storage 835, or data 840. In one embodiment, these virtual network identifiers are used as the piggybacked virtual network identifier. Processing at process block 615 completes, and processing continues to process block 620.

At process block 620, processor 810 associates the piggybacked virtual network identifier with the computing cluster. In one embodiment, this associating includes one or more of the following steps.

The compute control plane service retrieves the host group identifier, the network device identifier, and the virtual network identifiers from memory 815, storage 835, or data 840. The compute control plane service forms one or more mappings between the host group identifier (ClusterID), the network device identifier (SwitchID) and the layer 2 virtual network identifier (VLAN ID). Compute control plane service also forms a mapping between the host group identifier (ClusterID) and the layer 3 virtual network identifier (VX-LAN VNI). Compute control plane service stores these mappings, for example, in memory 815, storage 835, or data 840. In one embodiment, these mappings serve to associate the piggybacked virtual network identifier with the computing cluster.

Additionally, a virtual network interface card (VNIC) is associated with the computing cluster to enable the customer to access the computing cluster through the VNIC.

Processing at process block 620 completes, and processing continues to process block 625.

At process block 625, processor 810 adds the piggybacked virtual network identifier to the digital certificate. In one embodiment, this adding includes one or more of the following steps.

Processor 810 activates a public key infrastructure (PKI) certificate agent. The PKI certificate agent generates a private key and request a digital certificate from a PKI service. The PKI service is custom-configured to retrieve the piggybacked virtual network identifier from memory 815, storage 835, or data 840, and include it in the requested certificate. Accordingly, this PKI service may be private, and inaccessible outside of embodiments of the disclosed system. In some embodiments, the PKI service retrieves the piggybacked virtual network identifier, includes it in the digital certificate, and signs it. In some embodiments, the PKI service retrieves the piggybacked virtual network identifier, includes it as an encrypted (customer-opaque) blob within an X.509 attribute of the digital certificate, and signs it.

For example, the PKI service embeds the ClusterID: VXLAN VNI and SwitchID: VLAN mappings (the piggybacked virtual network identifier) in the digital certificate as a subject alternative name (SAN). In one embodiment, the PKI service embeds the piggybacked virtual network identifier as a maUPN X.509 attribute. A UPN type attribute was selected because it is included in the X.509 attributes and extensions that the open-source FreeRADIUS server makes available for processing. maUPN was specifically selected because it is a proprietary extension that is unlikely to be otherwise used in the environment of this embodiment, making it available for this use. In environments that make other use of the maUPN proprietary extension, an alternative attribute may be selected.

In one embodiment, the PKI service operates a private certificate authority to authenticate the digital certificates that it issues. The certificate authority should not be accessible outside of embodiments of the disclosed system, because certificate signed by the certificate authority would be considered valid for purposes of 802.1X authentication outside of the disclosed system, as well as inside it.

The PKI service returns the signed digital certificate to the PKI agent, which stores the digital certificate, for example, in memory 815, storage 835, or data 840. Processing at process block 625 completes, and processing continues to process block 630.

At process block 630, processor 810 provides the digital certificate at least to the at least one host. This is done to enable the at least one host to instruct the network device to create an isolated connection from the port to the virtual network associated with the computing cluster before the controlled port is opened. In one embodiment, the PKI agent transfers a copy of the digital certificate to each of the one or more hosts of the computing cluster, for example through a metadata distribution service used to configure/provision the one or more hosts. Using the digital certificate, the at least one host may instruct the network device to create an isolated connection as discussed above. Processing at process block 630 completes and processing continues to end block 635, where the process 600 completes.

Periodic Re-Authentication

In one embodiment, currency of authentication is maintained through the use of short-lived digital certificates, and no certificate revocation mechanism is employed. Certificates will be re-generated periodically while the cluster is in operation. The updated digital certificates may be made available by the metadata distribution service. Thus, switch 105 may require periodic reauthentication of the supplicant host. The controlled port will be placed into the unauthorized state and traffic to and from that port (apart from authentication packets) will be dropped if (i) the port operational status changes (for example the connection between the supplicant host and the port is terminated, or (ii) a reauthentication attempt fails. In order to successfully re-authenticate, the host 140 should be configured to periodically fetch updated credentials (such as a current digital certificate) and restart the supplicant authentication process. This fetch of updated credentials may be affirmatively made rather than passively received, as the supplicant may not automatically retrieve credentials in response to an update.

Non-Transitory Computer-Readable Medium Embodiments

Figure 7:
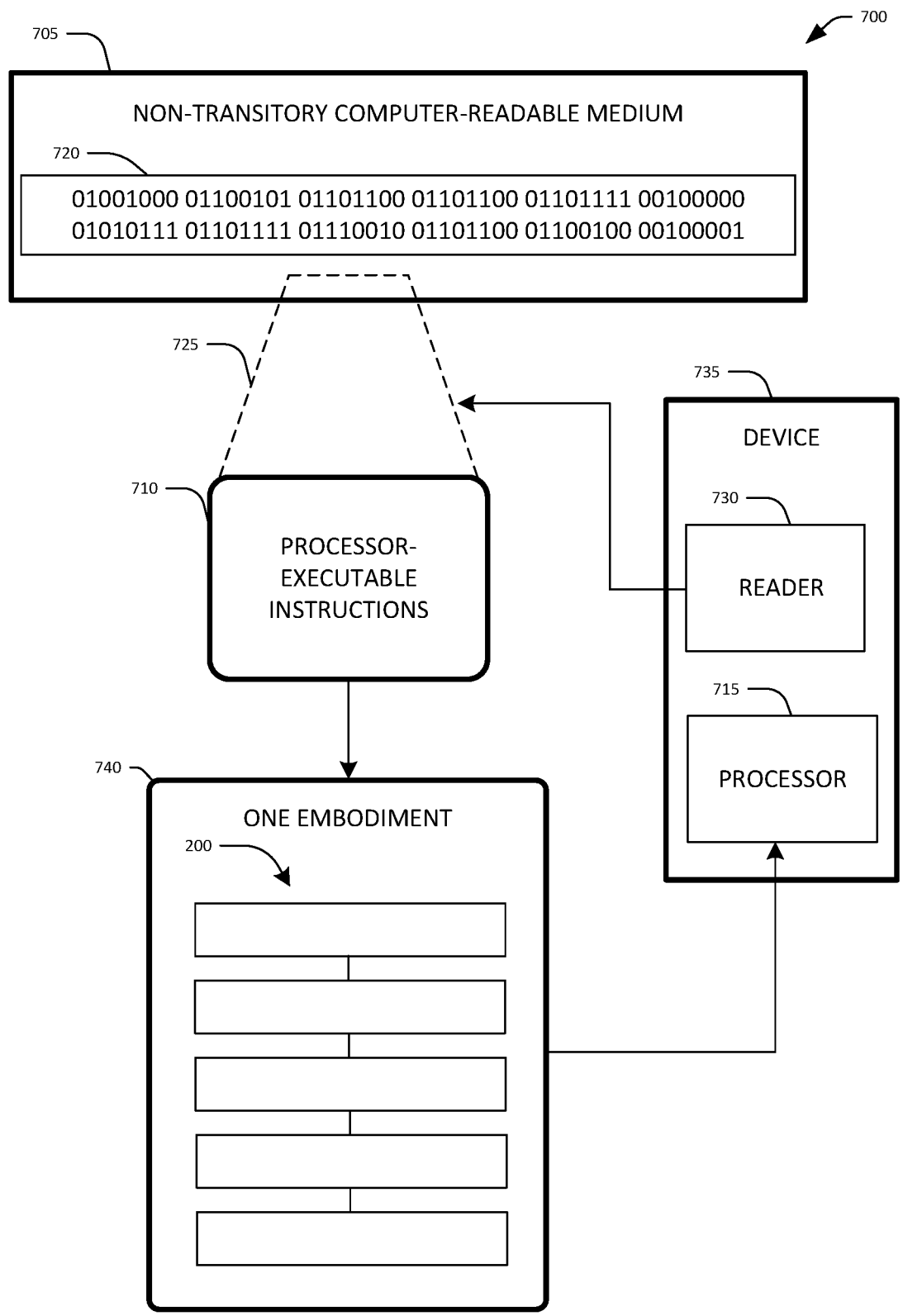
FIG. 7 illustrates an embodiment of a non-transitory computer-readable medium configured with instructions for performing one embodiment of the method disclosed.

FIG. 7 shows a scenario 700 wherein the described methods and/or their equivalents may be implemented using computer-executable instructions stored on an example non-transitory computer-readable medium 705. In one embodiment, one or more of the components described herein are configured as program modules, such as those of system 100 associated with cloud computing cluster isolation with strong authentication and automatic configuration deployment, stored in the non-transitory computer-readable medium 705. The program modules are configured with stored instructions, such as processor-executable instructions 710, that when executed by at least a processor, such as processor 715, (and potentially using other associated components) cause the computing device to perform the corresponding function(s) as described herein. For example, functionality of the monitoring system 100 associated with applying machine learning to below-the-line threshold tuning, stored in the non-transitory computer-readable medium 705, may be executed by the processor 715 as the processor-executable instructions 710 to perform an embodiment 740 of the method 200 of FIG. 2 or other methods described herein. In one embodiment, a network switch is implemented with one or more executable algorithms that are configured to perform one or more of the disclosed methods.

The non-transitory computer-readable medium 705 includes the processor-executable instructions 710 and/or data that when executed by a processor 715 cause performance of at least some of the provisions herein. Data may function as processor-executable instructions 710 in some embodiments. The non-transitory machine readable medium 705 includes a memory semiconductor (such as, for example, a semiconductor utilizing static random-access memory (SRAM), dynamic random-access memory (DRAM), and/or synchronous dynamic random-access memory (SDRAM) technologies), a platter of a hard disk drive, a flash memory device, or a magnetic disk, magnetic tape, or other magnetic media, or optical disc (such as a compact disk (CD), a digital versatile disk (DVD)), an application specific integrated circuit (ASIC), a programmable logic device, a read only memory (ROM), a memory chip or card, a memory stick, solid state storage device (SSD), flash drive, or other media from which a computing device can retrieve information. Non-transitory computer-readable media described herein are limited to statutory subject matter under 35 U.S.C § 101. The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the method 200 of FIG. 2, for example. In some embodiments, the processor-executable instructions 710 are configured to cause implementation of a system, such as at least some of the system 100 of FIG. 1, for example.

Computing Device Embodiment

FIG. 8 illustrates an example computing device 800 that is specially configured and/or programmed with one or more of the example systems and methods described herein, and/or equivalents. The example computing device may be a computer 805 that includes a hardware processor 810, a memory 815, and input/output ports 820 operably connected by a bus 825. In one example, the computer 805 includes cluster isolation logic 830 configured to facilitate performance of operations, such as at least some of the method 200 of FIG. 2 or to cause implementation of a system, such as at least some of the system 100 of FIG. 1, or other methods or systems described herein. In different examples, the logic 830 may be implemented in hardware, a non-transitory computer-readable medium 705 with stored instructions, firmware, and/or combinations thereof. While the logic 830 is illustrated as a hardware component attached to the bus 825, it is to be appreciated that in other embodiments, the logic 830 could be implemented in the processor 810, stored in memory 815, or stored in disk 835.

In one embodiment, logic 830 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to implement cloud computing cluster isolation with strong authentication and automatic configuration deployment. The means may also be implemented as stored computer executable instructions that are presented to computer 805 as data 840 that are temporarily stored in memory 815 and then executed by processor 810.

Logic 830 may also provide means (e.g., hardware, non-transitory computer-readable medium that stores executable instructions, firmware) for performing cloud computing cluster isolation with strong authentication and automatic configuration deployment.

Generally describing an example configuration of the computer 805, the processor 825 may be a variety of various hardware processors including dual microprocessor and other multi-processor architectures. A memory 815 may include volatile memory and/or non-volatile memory. Non-volatile memory may include, for example, ROM, PROM, EPROM, EEPROM and so on. Volatile memory may include, for example, RAM, SRAM, DRAM, and so on.

Storage 835 may be operably connected to the computer 805 via, for example, an input/output (I/O) interface (e.g., card, device) 845 and an input/output port 820. The storage 835 may be, for example, one or more of a magnetic disk drive, a solid state disk drive, a floppy disk drive, a tape drive, a Zip drive, a flash memory card, a memory stick, or other non-transitory computer-readable media. Furthermore, the storage 835 may be a CD-ROM drive, a CD-R drive, a CD-RW drive, a DVD ROM, and so on. The memory 815 can store a process 850 and/or a data 840, for example. The disk storage 835 and/or the memory 815 can store an operating system that controls and allocates resources of the computer 805.

The computer 805 may interact with input/output (I/O) devices via the I/O interfaces 845 and the input/output ports 820. Input/output devices may be, for example, a keyboard, a microphone, a pointing and selection device, cameras, video cards, displays, the storage 835, the network devices 855, and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network 860, the computer 805 may be logically connected to remote computers 865. Networks with which the computer 805 may interact include, but are not limited to, a LAN, a WAN, and other wired and/or wireless networks. The computer 805 may manage data communications to and from the I/O interfaces with I/O controllers 870.

The computer 805 may exchange electronic messages with the remote computers over the network. Such electronic messages may be provided as emails, short message service (SMS) messages or other types of message using Transmission Control Protocol (TCP)/Internet Protocol (IP) or other communication protocols.

Network Device Embodiment

FIG. 9 illustrates an example network device 900 that is specially configured and/or programmed with one or more of the example systems and methods described herein, and/or equivalents. The example network device 900 may be a network switch 905. Network switch 905 may include a hardware processor 910, a memory 915, and input/output ports 920 operably connected by a bus 925, as well as cluster isolation logic 930, storage 935, data 940, input/output (I/O) interface (e.g., card, device) 945, input/output controllers 970. Memory 915 may store, for example, a process 950 or data 940. Each of the foregoing components of the switch has similar functions as the components of the same name described above with reference to FIG. 8.

Network switch 905 additionally includes a switch fabric 975 operably connected by bus 925 to hardware processor 910, memory 915, and input/output ports 920. Switch fabric 975 is further operably connected to network ports 980. Through the network devices 855, the network switch 905 may interact with a network 960. Through the switch fabric 975, the network switch 905 may be logically connected to remote computers 965, and may further control the network 960 or connections between remote computers 965 in the network 960. Networks that the network switch 905 may control or otherwise interact with include, but are not limited to, a LAN, a WAN, and other wired and/or wireless networks.

The network switch 905 may exchange electronic messages with the remote computers over the network. Such electronic messages may be provided as EAP frames compatible with one or more EAP methods, such as EAP-TLS, emails, short message service (SMS) messages or other types of message using Transmission Control Protocol (TCP)/Internet Protocol (IP) or other communication protocols.

Definitions and Other Embodiments

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection. Any connection described herein may be presumed to be an operable connection, except where expressly stated otherwise.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method to be performed on a network device that includes at least one physical port logically divided into (i) a controlled port and (ii) an uncontrolled port, the method comprising:
in response to receiving an authentication frame that includes a piggybacked virtual network identifier within a digital certificate through the uncontrolled port, wherein the uncontrolled port is a logical port restricted to only allow authentication traffic to pass through,
(i) extracting data from the authentication frame for performing authentication, and
(ii) parsing the authentication frame to extract the piggybacked virtual network identifier from the digital certificate, wherein the piggybacked virtual network identifier indicates a virtual network dedicated to network traffic of one computing cluster; and
in response to successful authentication and identification of the piggybacked virtual network identifier, creating an isolated connection between the controlled port and the virtual network that is identified by the piggybacked virtual network identifier, wherein in the isolated connection the traffic received through the controlled port is isolated within the virtual network from other traffic passing through the network device that is not associated with the one computing cluster.

2. The method of claim 1, wherein the creating the isolated connection further comprises:
connecting the controlled port to the virtual network as the isolated connection in order to isolate the controlled port before opening the controlled port; and
after the controlled port is isolated, opening the controlled port to permit the passage of network traffic between a host and the virtual network through the isolated connection.

3. The method of claim 1, further comprising receiving the authentication frame through the uncontrolled port when the controlled port is closed, wherein the piggybacked virtual network identifier passes through the uncontrolled port as hidden data added to a digital certificate included as a credential in the authentication frame.

4. The method of claim 1, wherein a second virtual network has a second isolated connection to a port that does not have an isolated connection to the virtual network, the method further comprising controlling network traffic to isolate the second virtual network from the network traffic received through the controlled port.

5. The method of claim 1, further comprising:
permitting network traffic to enter the virtual network only through either (i) the isolated connection or (ii) one or more additional isolated connections to one or more additional controlled ports; and
preventing network traffic that enters the virtual network from exiting the virtual network except through either (i) the isolated connection or (ii) the one or more additional isolated connections.

6. The method of claim 5, wherein at least one of the one or more additional controlled ports is a logical division of a second physical port included in a second networking device and the virtual network includes an overlay network for interconnecting two or more subnetworks, the method further comprising:
parsing the piggybacked virtual network identifier to identify
(i) an overlay network identifier that indicates the overlay network, and
(ii) a first subnetwork identifier that indicates a first virtual subnetwork associated with the networking device,
wherein the overlay network identifier functions as an instruction to create an isolated interconnection; and
in response to identifying the overlay network identifier, creating the isolated interconnection between the first virtual subnetwork and at least a second virtual subnetwork associated with the second networking device, wherein there is a second isolated connection between the second virtual subnetwork and the at least one of the one or more additional controlled ports.

7. The method of claim 1, wherein the creating the isolated connection between the controlled port and a virtual network effects a dynamic network configuration of a customer overlay network without modifying a static configuration of the network device.

8. The method of claim 1, wherein identifying the piggybacked virtual network identifier in the authentication frame received through the uncontrolled port avoids communicating with a hypervisor or smart network interface card.

9. A non-transitory computer-readable medium storing computer-executable instructions that when executed by at least a processor of a network device that includes at least one physical port logically divided into (i) a controlled port and (ii) an uncontrolled port, cause the network device to:
in response to receiving an authentication frame that includes a piggybacked virtual network identifier within a digital certificate through the uncontrolled port, wherein the uncontrolled port is a logical port restricted to only allow authentication traffic to pass through,
(i) extract data from the authentication frame for performing authentication, and
(ii) parse the authentication frame to extract the piggybacked virtual network identifier from the digital certificate, wherein the piggybacked virtual network identifier indicates a virtual network dedicated to network traffic of one computing cluster; and
in response to successful authentication and identification of the piggybacked virtual network identifier, create the isolated connection between the controlled port and a virtual network that is identified by the piggybacked virtual network identifier, wherein in the isolated connection the traffic received through the controlled port is isolated within the virtual network from other traffic passing through the network device that is not associated with the one computing cluster.

10. The non-transitory computer-readable medium of claim 9, further comprising instructions that when executed by at least the processor cause the network device to:
connect the controlled port to the virtual network as the isolated connection in order to isolate the controlled port before opening the controlled port; and
after the controlled port is isolated, open the controlled port to permit the passage of network traffic between a host and the virtual network through the isolated connection.

11. The non-transitory computer-readable medium of claim 9, further comprising instructions that when executed by at least the processor cause the network device to receive the authentication frame through the uncontrolled port when the controlled port is closed, wherein the piggybacked virtual network identifier passes through the uncontrolled port within a digital certificate included as a credential in the authentication frame.

12. The non-transitory computer-readable medium of claim 9, wherein a second virtual network has a second isolated connection to a port that does not have an isolated connection to the virtual network, further comprising instructions that when executed by at least the processor cause the network device to control network traffic to isolate the second virtual network from the network traffic received through the controlled port.

13. The non-transitory computer-readable medium of claim 9, wherein the instructions that when executed by at least the processor cause the network device to control network traffic to isolate the virtual network further cause the processor to:
   permit network traffic to enter the virtual network only through either (i) the isolated connection or (ii) one or more additional isolated connections to one or more additional controlled ports; and
   prevent network traffic that enters the virtual network from exiting the virtual network except through either (i) the isolated connection or (ii) the one or more additional isolated connections.

14. The non-transitory computer-readable medium of claim 13, wherein at least one of the one or more additional controlled ports is a logical division of a second physical port included in a second networking device and the virtual network includes an overlay network for interconnecting two or more subnetworks, further comprising instructions that when executed by at least the processor cause the network device to:
   parse the piggybacked virtual network identifier to identify
      (i) an overlay network identifier that indicates the overlay network, and
      (ii) a first subnetwork identifier that indicates a first virtual subnetwork associated with the networking device,
      wherein the overlay network identifier functions as an instruction to create an isolated interconnection; and
   in response to identifying the overlay network identifier, create the isolated interconnection between the first virtual subnetwork and at least a second virtual subnetwork associated with the second networking device, wherein there is a second isolated connection between the second virtual subnetwork and the at least one of the one or more additional controlled ports.

15. The non-transitory computer-readable medium of claim 9, further comprising instructions that when executed by at least a computer processor of a computer cause the computer to:
   instantiate a computing cluster in a cloud computing environment, wherein at least one host in the computing cluster is linked to the at least one physical port;
   generate the piggybacked virtual network identifier;
   associate the piggybacked virtual network identifier with the computing cluster;
   add the piggybacked virtual network identifier to the digital certificate; and
   provide the digital certificate at least to the at least one host to enable the at least one host to instruct the network device to create an isolated connection from the port to the virtual network associated with the computing cluster before the controlled port is opened.

16. A computer networking switch, comprising:
   at least one physical port logically divided into (i) a controlled port and (ii) an uncontrolled port;
   a processor configured to at least execute instructions;
   a non-transitory computer-readable medium operably connected to the processor and storing computer-executable instructions that when executed by at least the processor cause the processor to:
      in response to receiving an authentication frame that includes a piggybacked virtual network identifier within a digital certificate through the uncontrolled port, wherein the uncontrolled port is a logical port restricted to only allow authentication traffic to pass through,
         (i) extract data from the authentication frame for performing authentication, and
         (ii) parse the authentication frame to extract the piggybacked virtual network identifier from the digital certificate, wherein the piggybacked virtual network identifier indicates a virtual network dedicated to network traffic of one computing cluster; and
      in response to successful authentication and identification of the piggybacked virtual network identifier, create the isolated connection between the controlled port and a virtual network that is identified by the piggybacked virtual network identifier, wherein in the isolated connection the traffic received through the controlled port is isolated within the virtual network from other traffic passing through the network device that is not associated with the one computing cluster.

17. The computer networking switch of claim 16, wherein the non-transitory computer-readable medium stores further computer-executable instructions that when executed by at least the processor cause the computer networking switch to:
   connect the controlled port to the virtual network as the isolated connection in order to isolate the controlled port before opening the controlled port; and
   after the controlled port is isolated, open the controlled port to permit the passage of network traffic between a host and the virtual network through the isolated connection.

18. The computer networking switch of claim 16, wherein the non-transitory computer-readable medium stores further computer-executable instructions that when executed by at least the processor cause the computer networking switch to receive the authentication frame through the uncontrolled port when the controlled port is closed, wherein the piggybacked virtual network identifier passes through the uncontrolled port within a digital certificate included as a credential in the authentication frame.

19. The computer networking switch of claim 16, wherein the non-transitory computer-readable medium stores further computer-executable instructions that when executed by at least the processor cause the computer networking switch to:
   permit network traffic to enter the virtual network only through either (i) the isolated connection or (ii) one or more additional isolated connections to one or more additional controlled ports; and
   prevent network traffic that enters the virtual network from exiting the virtual network except through either (i) the isolated connection or (ii) the one or more additional isolated connections.

20. The computer networking switch of claim 16, further comprising a second controlled port that does not have an isolated connection to the virtual network, wherein the non-transitory computer-readable medium stores further computer-executable instructions that when executed by at least the processor cause the computer networking switch to:
   create a second isolated connection between the second controlled port and a second virtual network; and
   control network traffic to isolate the second virtual network from the network traffic received through the controlled port.

\* \* \* \* \*